_United States Patent Office_

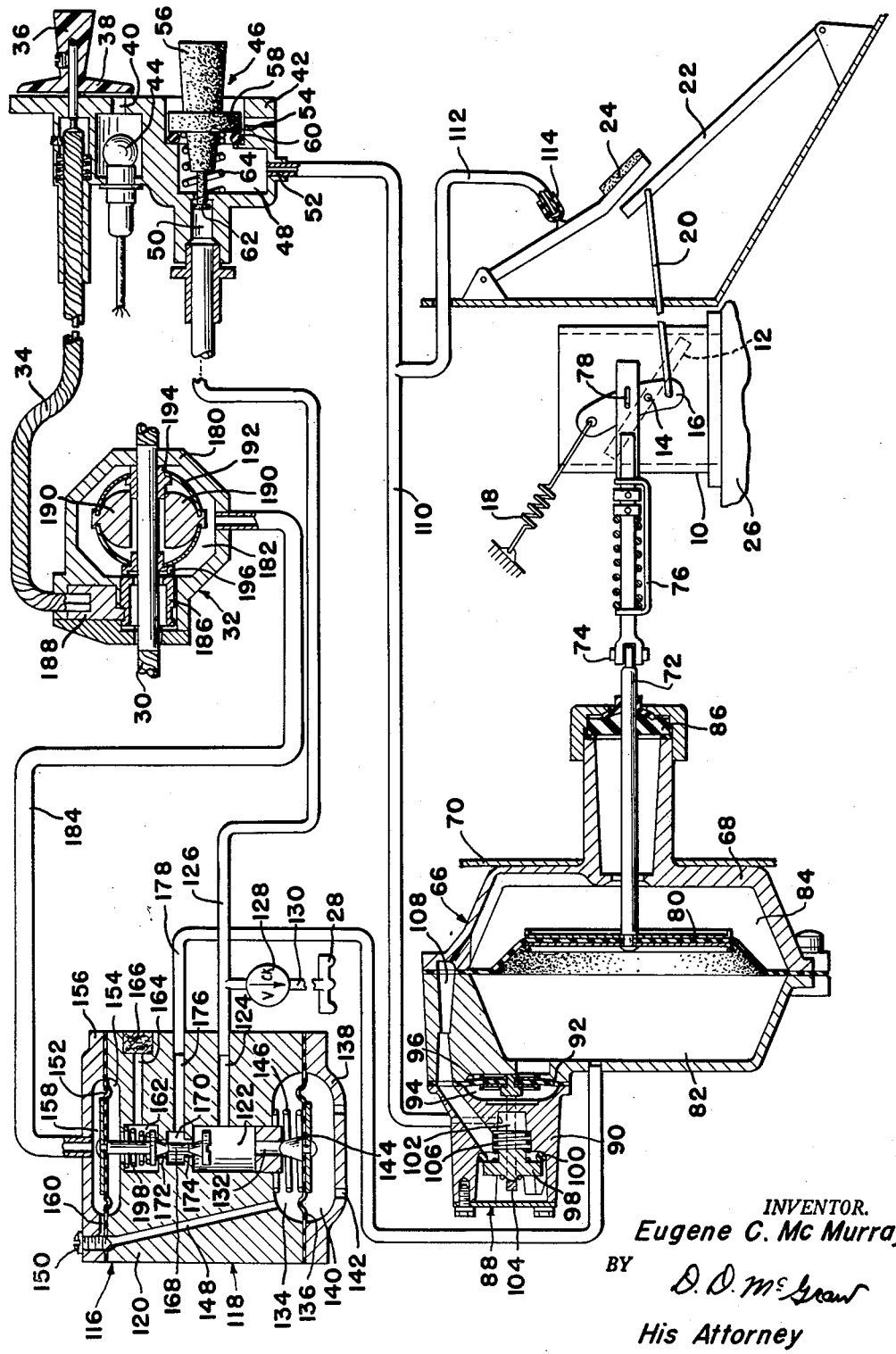

3,132,711
Patented May 12, 1964

3,132,711
VEHICLE SPEED CONTROL
Eugene C. McMurray, Flint, Mich., assignor to General Motors Corporation, Detroit, Mich., a corporation of Delaware
Filed May 20, 1963, Ser. No. 281,428
4 Claims. (Cl. 180—82.1)

The invention relates to a vehicle speed control system and more particularly to one wherein two operational modes are available. In one mode of operation the system will apply additional accelerator pedal loading when the vehicle attains a desired speed set into the system. The vehicle operator may continue to control the vehicle manually by the accelerator pedal. Should he desire to accelerate the vehicle beyond the set speed, he operates the pedal to overcome the additional pedal load by increasing the force applied with his foot. Thus, the force exerted on the accelerator pedal provides a speed warning to the vehicle operator which may be overcome if necessary.

The system may also be operated to maintain the vehicle speed at the desired set speed, with this mode of operation preferably being attained only upon initial attainment of the speed warning condition of operation. The vehicle operator is required to manually condition the system to shift it into the speed maintaining mode. The operator may perform this operation at any time while the speed warning force is apparent to his foot. The vehicle will then maintain the set speed, taking into account road load conditions without further assistance from the operator's foot. While in the speed maintaining condition, the vehicle operator may accelerate the vehicle above the set speed in order to pass other vehicles or to manually operate the vehicle at a higher speed without having to overcome any additional pedal effort such as that which is present in the speed warning mode of operation. The system is arranged so that it may be manually returned to the speed warning mode of operation by operating the control which places it in the speed maintaining mode of operation, or by operation of the vehicle brake pedal. The desired speed which is set into the system may be varied at any time while the vehicle is below the set speed, or in the speed warning mode of operation, or in the speed maintaining mode of operation. If the set speed is decreased while the system is in the speed warning condition, an increase in pedal effort will be obtained. Conversely, the additional pedal effort is removed if the set speed is increased so that it is above the actual vehicle speed. When the set speed is changed while the system is maintaining the vehicle speed, an automatic vehicle response occurs which either accelerates or decelerates the vehicle to the new set speed.

The addition of the system embodying the invention to a vehicle does not change the normal accelerator pedal feel in normal vehicle operation since the power servo of the unit operates against the throttle return spring for its load. Lost motion mechanism between the power servo and the throttle linkage allows for independent throttle linkage operation when the system is not providing a speed warning or maintaining the vehicle speed. The system preferably operates with the engine intake vacuum as the power pressure and utilizes a valve sensitive to the vehicle actual speed and the desired set speed to establish a speed responsive pressure from a regulated manifold vacuum pressure. The speed responsive pressure is amplified and delivered to the power servo as a control pressure. This pressure acts on the servo to move throttle linkage, or urge its movement, in a decreasing engine speed direction. The system is also preferably provided with an inhibitor valve mechanism which maintains atmospheric pressure in another servo chamber until the control pressure is present in the first servo chamber so that the vehicle cannot be accelerated under servo power until it is operating in the speed maintaining condition of operation. After the control pressure places the system in the speed warning condition of operation, the vehicle operator may manually set the system to maintain the set speed by introducing intake manifold vacuum through the inhibitor valve system into the power servo so that it acts in opposition to the control pressure, thereby moving the engine throttle controls as necessary to maintain the set vehicle speed.

In the drawing:
A vehicle speed control system embodying the invention is schematically illustrated, with parts being broken away and in section.

The vehicle in which the system is installed is provided with the usual engine including a carburetor 10 having a throttle valve 12 the position of which controls the engine speed and therefore the speed of the vehicle. The throttle valve is illustrated in the drawing as being substantially closed. Valve 12 is mounted on a shaft 14 to which is connected an arm 16 which is a part of the throttle linkage. The throttle closing spring 18 is connected to the arm 16 and a suitable part of the engine so that it urges the valve 12 toward the zero throttle position. Suitable throttle linkage schematically illustrated by the link 20 connects the accelerator pedal 22 to the arm 16 so that downward movement of the pedal opens the throttle valve in the usual manner. A vehicle brake pedal 24 is suspended on the vehicle body so that it is readily available for operator operation to apply the vehicle brakes. The vehicle engine 26 includes an engine intake manifold 28 which provides a source of pressure for operating the system.

The vehicle speedometer cable 30 is driven in accordance with actual vehicle speed and extends through the speed transducer 32 to provide an actual vehicle speed signal. The speed transducer 32 may be similar to the governor mechanism of Patent No. 3,064,669, issued November 20, 1962, to W. L. Sheppard, and entitled "Governor." The desired vehicle speed is set into the transducer 32 through the flexible cable 34 which is connected to be moved by the speed set knob 36. Knob 36 is positioned so that it is convenient for operation by the vehicle operator. It includes a dial 38 which may have numerals thereon indicating desired vehicle speeds and may be aligned with the passage 40 formed in support housing 42 so that the electrical lamp 44 illuminates the speed at which the knob is set.

Housing 42 also contains the speed maintaining set and release assembly 46. This assembly includes the chamber 48 having passages 50, 52 and 54 connected therewith. The set and release knob 56 is provided with an annular shoulder 58 which is engageable with an annular seal 60 positioned in passage 54 so as to seal that passage. An extension of knob 56 passes through chamber 48 and into passage 50, terminating with a valve 62 which operates to seal passage 50 when passage 54 is open and to open passage 50 when passage 54 is closed. Spring 64 acts against shoulder 58 so as to urge knob 56 to open passage 54 and valve 62 to close passage 50. As will be explained in detail, the presence of intake manifold vacuum in chamber 48 will act upon shoulder 58 to hold the shoulder against the force of spring 64 once the shoulder is moved to close passage 54. Should the pressure in chamber 48 approach atmospheric pressure beyond a predetermined point, spring 64 will open passage 54 and cause valve 62 to close passage 50.

The system also includes a power servo assembly 66, the housing 68 of which is secured to the mounting bracket 70, which is in turn secured to a suitable part of the engine 26. A rod 72 extends from assembly 66 and is connected to the throttle valve arm 16 by means of the pivot joint 74, override mechanism 76, and the pin-and-slot lost motion connection 78. Rod 72 is connected to a power wall 80 formed as a diaphragm and secured between two halves of the housing 68 to divide the housing into a first chamber 82 and a second chamber 84. Chamber 82 is the speed warning chamber and chamber 84 is the speed maintaining control chamber. A suitable seal 86 is provided about rod 72 to seal chamber 84 from the atmosphere. An inhibitor assembly 88 is provided as a part of the housing 68, with the inhibitor housing section 90 being secured to the portion of housing 68 forming the chamber 82. A diaphragm 92 is received between housing section 90 and housing 68 and cooperates therewith to define opposed chambers 94 and 96. Chamber 96 is in communication with chamber 82 so that the pressure in chamber 82 acts on one side of diaphragm 92. Chamber 94 is connected to atmosphere at all times. A valve 98 is received within housing section 90 so that it is engageable with the valve seat 100. Housing 90 is also provided with a chamber 102 which is sealed from atmosphere when valve 98 engages seat 100. A bail 104 connected to diaphragm 92 extends around chamber 102 and into engagement with valve 98 so that movement of diaphragm 92 toward chamber 82 pulls the valve against the force of the valve spring 106 to cause the valve to engage its seat 100. A passage 108 is formed through housing section 90 and the other portions of housing 68 so as to connect chamber 102 with the servo speed maintaining control chamber 84. Thus, at all times when valve 98 is unseated, atmospheric pressure is admitted directly to chamber 84. A conduit 110 is connected to chamber 102 and also to chamber 48 of the set and release assembly 46. A branch conduit 112 leading from conduit 110 is connected to a valve 114 which is normally closed when the brake pedal 24 is in the brake release position and is open to atmosphere when the brakes are applied by movement of pedal 24.

The system also includes a signal amplifier 116 and a pressure regulator assembly 118 which are preferably contained in the common housing 120. Housing 120 has a center chamber 122 which is connected to the engine intake manifold 28 by passage 124, conduit 126, check valve 128 and conduit 130. Conduit 126 is also connected to passage 50 of the set and release assembly 46. One end of chamber 122 is provided with a passage 132 leading to chamber 134 defined by one end of housing 120 and a diaphragm 136 held in place by a cap 138. Cap 138 is formed to provide an atmospheric chamber 140 on the other side of diaphragm 136, with chambers 134 and 140 being of equal area in relation to the diaphragm. Atmospheric vents 142 are provided to keep chamber 140 at atmospheric pressure. A regulator valve 144 secured to diaphragm 136 is positioned to modulate passage 132 under influence of the diaphragm spring 146 acting to open the valve and a pressure differential on diaphragm 136 acting to close the valve. The regulator action of valve 144 regulates the pressure in chamber 134 through passage 132 so that pressure in chamber 134 is maintained nearly constant even though the variable manifold vacuum is not regulated and the flow rates vary in the regulated side of the assembly. The regulator operates on the principle of two separate pressures operating on two different areas balancing the force exerted by a soft rate highly preloaded spring. The diaphragm position controls the relative orifice between the regulated and unregulated pressure levels to allow for varying flow conditions through the regulated side. The area of the diaphragm 136 to which regulated pressure is subjected is large in relation to the area of the valve 144 subjected to unregulated pressure. The regulator serves the purpose of limiting loads on the speed transducer assembly 32 to a level which does not appreciably alter the output of the transducer as a function of vehicle speed. It also provides a source of power to operate the signal amplified portion of the system.

The regulated pressure from chamber 134 is conducted through passage 148 to an adjustable orifice 150. The signal amplifier 116 includes a diaphragm 152 secured over a chamber 154 formed in the end of housing 120 opposite chamber 134. A cover 156 for diaphragm 152 defines the chamber 158 on the opposite side of diaphragm 152 from chamber 154. Chamber 158 is connected by passage 160 to the adjustable orifice 150 so that regulated pressure is permitted to enter chamber 158. Chamber 154 includes a valve spring retaining section 162 which is connected to atmospheric pressure through passage 164 and filter 166. The power control proportioning valve 168 is connected to diaphragm 152 and is urged toward chamber 122 by spring 198. A control pressure output chamber 170 connects with chamber 162 and chamber 122 respectively through orifices 172 and 174 which are controlled by movement of valve 168. Control pressure output chamber 170 is connected through passage 176 and conduit 178 to the speed warning chamber 82 of the servo assembly 66.

The speed transducer 32 has a housing 180 formed to provide a chamber 182 which is connected through a conduit 184 to the signal amplifier chamber 158. A valve seat 186 is movably received in housing 180 under control of the speed set knob 36 acting through the flexible cable 34 and the valve seat actuator 188. The speed sensing element of assembly 32 is a flyball type spring loaded governor which converts a range of mechanical rotary speed to a varying pressure level as a function of the input set speed. The governor is located in chamber 182 and includes a pair of weights 190 mounted diametrically opposed on a looped spring element 192 which is rotatably driven by the speedometer cable driven shaft 30 through bushing 194. A valve 196 is connected with the spring 192 and is in position to engage valve seat 186. Valve seat 186 is annular in form and spaced sufficiently from shaft 30 to permit atmospheric air to enter chamber 182 when valve 196 is not seated. The position of seat 186 determines the level of preload on spring 192 along the axis of rotation of the spring and the amount of preload determines the desired speed input signal. As shaft 30 rotates in accordance with vehicle speed, the spring and weight assembly is driven through a clutch action between the spring and the bushing 194. When the governor reaches a speed range where the flyball centrifugal action has absorbed nearly all of the spring preload, the slightly higher pressure of atmospheric air acts on valve 196 to force its way into the chamber 182. This slightly diminishes the depression level of the pressure in chamber 182. As the speed is further increased, still less residual spring load assistance and more air under atmospheric pressure enters the governor body, increasing the absolute pressure further. When the spring load has been completely absorbed, only the ability of the conduit 184 to maintain a partial vacuum against the relatively large valve opening prevents the pressure level within chamber 182 from being completely diminished. The signal level range of pressure in conduit 184 is capable of varying between the regulated pressure in chamber 146 and substantially atmospheric pressure. Thus the pressure in conduit 184 and chamber 158 of the signal amplifier reflects vehicle speed in relation to the desired set speed. The signal amplifier 116 uses the relatively weak pressure signals in conduit 184, amplifies these signals to a relatively large force range, and converts this force to a valve position by use of a spring 198 received in housing section 162 to produce a specific position of power control proportioning valve 168 as a function of signal level. When the signal-energized diaphragm 152 is receiving a signal in chamber 158 which is outside of the proportional position range of valve 168, the net surplus of either the force of spring 198 or the force due to differential pressures acting on diaphragm 152 acts to positively seat valve 168 to close either orifice 172 or 174. When valve 168 is proportioning atmospheric air from passage 164 and raw intake manifold vacuum from passage 124, it produces a proportional control pressure in passage 176 and therefore in speed warning chamber 82. This is accomplished only within a vehicle speed range including the desired speed range which produces pressure signals in the governor chamber 182 which work with spring 198 to proportionally position valve 168.

The power to operate all of the pneumatic circuits in the system is supplied by the engine intake manifold vacuum as a depression from atmosphere. Mechanical energy is supplied to the governor by the speedometer drive cable to shaft 30. The rotational speed of the governor is proportional to vehicle velocity. The governor valve 196, the signal amplifier 116 and the regulator 118 constitute the signal circuit. The power control proportioning valve 168 and the power servo assembly 66 form the power circuit in speed warning. When the system is in the speed maintaining mode of operation, the power control proportioning valve 168, the power unit 66, the inhibitor assembly 88, and the speed maintaining set and release assembly 46 make up the power circuit. The assembly 46 and the brake operated release valve 114 are utilized to change the system from the speed maintaining mode of operation to the speed warning mode of operation and to keep the system in the speed warning mode until the operator again positively shifts the system to the speed maintaining mode.

The power control circuit operates on raw engine intake manifold vacuum with respect to atmospheric pressure. The power control proportioning valve 168 has the capability of providing a vacuum level as a percent of engine intake manifold vacuum proportional to its position within the housing 120. This vacuum level may be varied from 0% to 100% of engine intake manifold vacuum. When the desired set speed is above the actual vehicle speed, the control valve 168 is seated to close orifice 174 to prevent the admission of air from the speed warning chamber 82 into the manifold vacuum line 126. Thus the control valve 168 vents the speed warning chamber 82 to atmosphere under this condition, which may be referred to as a 0% of engine intake manifold vacuum. As the actual vehicle speed enters the control speed range, the signal circuit pressure levels change in a direction such that the control valve 168 is caused to move downwardly, tending to close the orifice 172 in proportion to its position and to open orifice 174 in proportion to that same position. At the midpoint of valve travel, the control pressure in passage 176 may be 50% of engine intake manifold vacuum level. As the signal circuit pressure levels change further with continued increase in vehicle speed, the valve 168 may be positioned at its extreme downward limit of movement, completely closing orifice 172 and completely opening orifice 174, thus providing 100% of engine intake manifold vacuum as the pressure in passage 176. This condition exists at and above the upper limit of the speed control range.

The output of the power control proportioning valve 168 is the control pressure which is applied through conduit 178 to chamber 82. In the speed warning mode of operation, full atmospheric pressure, i.e., no signal, a proportioned percent of engine intake manifold vacuum, or full engine intake manifold vacuum is continually applied to the speed warning chamber 82 with the vehicle below the set speed, in the speed control range, or above the speed control range, respectively. Thus a variable level differential pressure is acting from zero to a maximum upon the diaphragm 80 in the direction from the higher pressure side represented by chamber 84 to the lower pressure side represented by chamber 82. The pressure applied to the effective area of diaphragm 80 produces a force which is transmitted through rod 72, joint 74, mechanism 76, and connection 78 to the throttle linkage arm 16. The level of force developed in this manner in the power unit 66 is a function of the magnitude of speed error and the amount of engine intake manifold vacuum available.

The direction of the power servo output force is changed in the speed maintaining mode of operation by applying raw engine intake manifold vacuum to the speed control chamber 84. This is done by the operator pushing knob 56 in to seal shoulder 58 against seal 60. The intake manifold vacuum evacuates chamber 48 of the assembly 46 and chamber 84 of the servo assembly 66. The differential pressure acting on shoulder 58 holds the shoulder in sealing engagement with seal 60 against the force of spring 64, thus maintaining the evacuation of chamber 84 until the absolute pressure in chamber 48 cannot hold shoulder 58 against seal 60. In the speed maintaining mode of operation, when speed error signals indicate that the vehicle is below the set speed and the proportional control range, full atmospheric pressure is applied in the speed warning chamber. Due to the reduced pressure of raw engine intake manifold vacuum in the speed control chamber 84 the force sense is reversed. The force is applied from the higher pressure side represented by the speed warning chamber 82 toward the lower pressure side represented by the speed control chamber 84. This force is a maximum under this condition and is dependent on the level of engine intake manifold vacuum. This force is used to overcome the throttle closing spring 18 via the linkage connecting arm 16 to diaphragm 80, which is solid in this direction, to open the throttle to the system limits. When the vehicle speed enters the control range of vehicle speed, the speed transducer 32 modifies the pressure signal in conduit 184 and chamber 158 to change it from a saturated regulated pressure level to a proportional level. The power control proportioning valve then moves from the air inlet side toward the vacuum inlet side. The control pressure level in conduit 178 thus rises as a percent of engine intake manifold vacuum in proportion to the speed error. The control pressure in chamber 82 and full raw engine intake manifold vacuum in chamber 84 still produces a force in the throttle opening direction. However, this force is reduced in strength. As the speed error is decreased the force is further reduced and the force of the throttle closing spring overcomes the saturated throttle position and produces a definite throttle opening where the spring force of spring 18 and the effective output force of the servo assembly 66 are balanced.

When the control vacuum in chamber 82 becomes equal to the vacuum in chamber 84, there is substantially no further servo output of force. This condition occurs when the vehicle operator manually overrides the system in the speed control mode of operation or when the vehicle descends a steep grade where normal engine braking is incapable of preventing the vehicle from overrunning the set speed. The throttle closing spring 18 attempts to completely close the throttle valve 12 since the power unit has no output force which tends to overcome the throttle closing spring load. The only force preventing the throttle from being closed under these conditions may be the force of the operator's foot exerted on the accelerator pedal 22.

When the vehicle engine is started a very small volume of air is introduced into the engine intake manifold to recharge the regulator 118 and the circuit. After this initial charge there is no more air flow from the system into the manifold 28 until the vehicle is operated in the proportional control range in either speed warning or speed control. When the system is driven above the speed control range, only a minimum amount of air is bled into the manifold 28 from the signal circuit. Idle characteristics and power characteristics of the engine are therefore unaffected by the system when the vehicle is not in the proportional control speed range. The amount of air introduced in the engine intake manifold during constant operations in the proportional control range is small. Its effect on the vehicle is to provide a slightly increased vehicle economy during control since the fuel-air ratio is slightly increased. During the speed maintaining mode of system operation only slight throttle valve angle changes are necessary to maintain constant vehicle speeds under most road load conditions. The system responds to slight vehicle system changes in a timely manner and tends to prevent their growth so that the vehicle operator is normally unaware of the changes being affected.

In the claims:

1. A fluid pressure operated vehicle speed warning and maintaining control system for a vehicle having an engine and an engine control, said system comprising, a first source of a constant first fluid pressure, a second source of a variable second fluid pressure different from said first fluid pressure, pressure regulating means connected with said second source and establishing a third fluid pressure from said second pressure constituting a substantially constant regulated pressure, means responsive to actual vehicle speed and a pre-determined vehicle speed and said first pressure and said third pressure for generating fourth fluid pressure constituting a vehicle speed error signal pressure intermediate said first pressure and said third pressure at vehicle speeds equal to and above said predetermined vehicle speed, signal pressure amplifying means receiving and responsive to said fourth pressure and said first and second pressures and generating from said first and second pressures a speed responsive fifth fluid pressure in inverse relation to said fourth pressure, a servo having a movable wall and first and second fluid pressure chambers separated by said wall and a servo output member connected to said engine control and said wall to act on said engine control in accordance with pressures in said chambers, means connecting said first servo chamber with said signal pressure amplifying means to receive said fifth pressure, means selectively connecting said first and second pressure sources to said second servo chamber, and valve means responsive to said fifth pressure in said first servo chamber to connect said selectively connecting means to said second servo chamber and responsive to the absence of said fifth pressure in said first servo chamber to connect said second servo chamber to said first pressure source independently of said selectively connecting means.

2. A vehicle road speed control sytem for a vehicle having an engine throttle control, said system comprising, a source of first pressure different from atmospheric pressure, a pressure regulator receiving said first pressure and atmospheric pressure and generating a second intermediate regulated pressure, valve means sensitive to actual vehicle speed receiving said second pressure and operable at a desired speed to modify said second pressure by speed controlled admission of atmospheric pressure to establish a third pressure constituting a vehicle speed signal, signal amplifying means responsive to said third pressure and atmospheric pressure and having said first pressure input and atmospheric pressure input to produce a fourth pressure constituting a control pressure output inversely proportional to said third pressure, and servo means having a movable power wall connected to the engine throttle control and first and second chambers separated by said wall, said first servo chamber receiving said control pressure to urge said power wall and the engine throttle control in a vehicle speed decreasing direction.

3. The speed control system of claim 2, further comprising manually operated means operable to connect said first pressure to said second servo chamber to oppose said fourth pressure and in cooperation therewith act on said power wall to operate the engine throttle control to maintain the actual vehicle speed at the desired speed.

4. The speed control system of claim 3, further comprising valve means sensitive to said fourth pressure in said first chamber to selectively connect atmospheric pressure to said second chamber in the absence of said fourth pressure in said first chamber and to connect said first pressure to said second chamber in the presence of said fourth pressure in said first chamber subject to operation of said manually operated means.

References Cited in the file of this patent
UNITED STATES PATENTS

| | | |
|---|---|---|
| 3,003,475 | Rouvalis | Oct. 10, 1961 |
| 3,062,310 | McCathron et al. | Nov. 6, 1962 |
| 3,081,837 | Fiteny | Mar. 19, 1963 |
| 3,099,329 | Von Berg et al. | July 30, 1963 |